(12) United States Patent
Tossell et al.

(10) Patent No.: US 8,633,890 B2
(45) Date of Patent: Jan. 21, 2014

(54) GESTURE DETECTION BASED ON JOINT SKIPPING

(75) Inventors: Philip Tossell, Nuneaton (GB); Andrew Wilson, Leicestershire (GB)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 12/706,585

(22) Filed: Feb. 16, 2010

(65) Prior Publication Data

US 2011/0199291 A1 Aug. 18, 2011

(51) Int. Cl.
*G09G 5/00* (2006.01)

(52) U.S. Cl.
USPC ........... 345/156; 345/157; 345/158; 715/863; 463/36

(58) Field of Classification Search
USPC ................. 345/156–158; 463/36–39; 715/863
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |

(Continued)

FOREIGN PATENT DOCUMENTS

| CN | 1764931 | 4/2006 |
|---|---|---|
| CN | 1967525 | 5/2007 |

(Continued)

OTHER PUBLICATIONS

Qian, et al., "A Gesture-Driven Multimodal Interactive Dance System," 2004 IEEE International Conference on Multimedia and Expo (ICME), 2004, pp. 1579-1582.

(Continued)

*Primary Examiner* — Gene W Lee
(74) *Attorney, Agent, or Firm* — Vierra Magen Marcus LLP

(57) ABSTRACT

A system is disclosed for detecting or confirming gestures performed by a user by identifying a vector formed by non-adjacent joints and identifying the angle the vector forms with a reference point. Thus, the system skips one or more intermediate joints between an end joint and a proximal joint closer to the body core of a user. Skipping one or more intermediate joints results in a more reliable indication of the position or movement performed by the user, and consequently a more reliable indication of a given gesture.

20 Claims, 11 Drawing Sheets

(56) References Cited

U.S. PATENT DOCUMENTS

| | | |
|---|---|---|
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,313,463 B2 | 12/2007 | Herr et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,519,223 B2 | 4/2009 | Dehlin et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,931,604 B2 * | 4/2011 | Even Zohar et al. .......... 600/595 |
| 8,035,612 B2 | 10/2011 | Bell et al. |
| 8,035,614 B2 | 10/2011 | Bell et al. |

(56) References Cited

U.S. PATENT DOCUMENTS

| | | | |
|---|---|---|---|
| 8,035,624 B2 | 10/2011 | Bell et al. | |
| 8,072,470 B2 | 12/2011 | Marks | |
| 2001/0003449 A1* | 6/2001 | Kimura | 345/157 |
| 2002/0012014 A1* | 1/2002 | Mohri | 345/863 |
| 2006/0025229 A1* | 2/2006 | Mahajan et al. | 473/131 |
| 2008/0026838 A1 | 1/2008 | Dunstan et al. | |
| 2008/0152191 A1 | 6/2008 | Fujimura et al. | |
| 2008/0231926 A1 | 9/2008 | Klug et al. | |
| 2008/0309615 A1* | 12/2008 | Sato | 345/156 |
| 2009/0077504 A1 | 3/2009 | Bell et al. | |
| 2009/0103780 A1 | 4/2009 | Nishihara et al. | |
| 2009/0141933 A1 | 6/2009 | Wagg | |
| 2009/0221368 A1 | 9/2009 | Yen et al. | |
| 2009/0228841 A1 | 9/2009 | Hildreth | |
| 2010/0093435 A1 | 4/2010 | Glaser et al. | |
| 2010/0164862 A1* | 7/2010 | Sullivan et al. | 345/156 |
| 2011/0129124 A1* | 6/2011 | Givon | 382/107 |

FOREIGN PATENT DOCUMENTS

| | | |
|---|---|---|
| CN | 101308500 | 11/2008 |
| CN | 1599177 | 12/2009 |
| CN | 101254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Zhao, Liang, "Dressed Human Modeling Detection and Parts Localization," The Robotics Institute, Carnegie Mellon University, Pittsburgh, PA, Jul. 26, 2001, 121 pages.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Stefanov, "A Real-Time Hand Tracker using Variable-Length Markov Models of Behaviour", Computer Vision and Image Understanding, Oct. 2007, pp. 98-115, vol. 108, Issue 1-2, Elsevier Science Inc. New York, NY, USA.

Pradhan, "Hand-Gestrure Computing for the Hearing and Speech Impaired", IEEE MultiMedia, Apr. 2008, pp. 20-27, vol. 15, Issue 2, IEEE Computer Society Press Los Alamitos, CA, USA.

Forbes, "Motion Curves: A Versatile Representation for Motion Data", M.S. Thesis, Graduate Department of Computer Science, 2005, 92 pages, University of Toronto.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Voluntary Claim Amendments filed Sep. 26, 2011 in Chinese Patent Application No. 201110043269.4.

English translation of claims as amended on Sep. 26, 2011 in Chinese Patent Application No. 201110043269.4.

Office Action dated Aug. 31, 2012 in Chinese Patent Application No. 201110043269.4.

English Abstract for CN1599177 published Dec. 9. 2009.

English Abstract for CN101308500 published Nov. 19, 2008.

English Abstract for CN1764931 published Apr. 26, 2006.

Office Action dated May 2, 2013 in Chinese Patent Application No. 201110043269.4.

(56) References Cited

OTHER PUBLICATIONS

Response to Office Action filed May 13, 2013 in Chinese Patent Application No. 201110043269.4.
English translation Summary of Response to Office Action and Amended claims filed May 13, 2013 in Chinese Patent Application No. 201110043269.4.
English Abstract for CN1967525 published May 23, 2007.
Response of Office Action filed Jan. 5, 2013 in Chinese Patent Application No. 201110043269.4.
Office Action dated Aug. 21, 2013 in Chinese Patent Application No. 2201110043269.4.
English traslation and summary of text of Office Action dated Aug. 21, 2013 in Chinese Patent Application No. 201110043269.4.
Response to Office Action filed Aug. 28, 2013 in Chinese Patent Application No. 201110043269.4.
English translation of Summary of Response to Office Action and Amended claims filed Aug. 28, 2013 in Chinese Patent Application No. 201110043269.4.

* cited by examiner

GESTURE DETECTION BASED ON JOINT SKIPPING

BACKGROUND

In the past, computing applications such as computer games and multimedia applications used controls to allow users to manipulate game characters or other aspects of an application. Typically such controls are input using, for example, controllers, remotes, keyboards, mice, or the like. More recently, computer games and multimedia applications have begun employing cameras and software gesture recognition engines to provide a human computer interface ("HCI"). With HCI, user gestures are detected, interpreted and used to control game characters or other aspects of an application.

In conventional gaming and multimedia applications, a user's body position is often used to measure whether or not the user has performed a given gesture. In particular, the HCI system may measure the angle formed by a vector through a pair of adjacent joints relative to a reference plane, such as horizontal. That angle, by itself or together with other pose or motion information, is used to identify a gesture that the user has performed. Thus, as an example, the HCI system may measure the angle that a user's forearm (as indicated by the positions of the wrist and elbow) forms with a horizontal reference plane to identify whether a user has performed a given gesture.

The problem with such traditional methods of gesture detection is that angles formed between two adjacent end joints are subject to large amounts of jitter and noise. As such, using adjacent joints can at times be unreliable for gesture detection.

SUMMARY

The present technology in general relates to detecting or confirming gestures by identifying a vector formed by non-adjacent joints and identifying the angle the vector forms with a reference point, plane or line. Thus, embodiments of the present technology skip one or more intermediate joints between an end joint and a proximal joint closer to the body core of a user. Skipping one or more intermediate joints results in a more reliable indication of the position or movement performed by the user, and consequently a more reliable indication of a given gesture. This methodology of gesture detection may be used instead of traditional end-joint gesture detection, or as a confirmation of traditional end-joint gesture detection.

In an embodiment, the present system is provided for detecting gestures performed by a user in real world space. The system includes a capture device for capturing a depth image of a user within the field of view and a computing environment. The computing environment receives the depth image from the capture device and determines a location of a plurality of joints of the user. The plurality of joints include an end joint, at least one intermediate joint proximal of the end joint, and a core body joint proximal of the at least one intermediate joint. The system further includes a processor in the capture device or processor for generating a non-adjacent joint position vector. The non-adjacent joint position vector has end points at an end joint and a joint that is not adjacent to the end join from one of the intermediate joints and core body joint. The non-adjacent joint position vector is used to determine whether the user has performed a predefined gesture.

DETAILED DESCRIPTION

Embodiments of the present technology will now be described with reference to FIGS. 1-13, which in general relate to a system for identifying gestures from pose information, including joint position vectors obtained using a vector through a pair of joints that are not adjacent to each other. In embodiments, the system may measure an angle formed between a reference point, plane or line and a pair of non-adjacent joints. For example, the system may use an end joint, such as an ankle, and a proximal joint closer to the body core, such as a hip. The system skips one or more intermediate joints between the proximal joint and the end joint. Using a proximal joint and skipping one or more intermediate joints results in a more reliable indication of the pose or movement performed by the user, and consequently a more reliable indication of a given gesture. This methodology of gesture detection may be used instead of traditional adjacent joint gesture detection, or as a confirmation of traditional adjacent joint gesture detection.

Figure 1A:
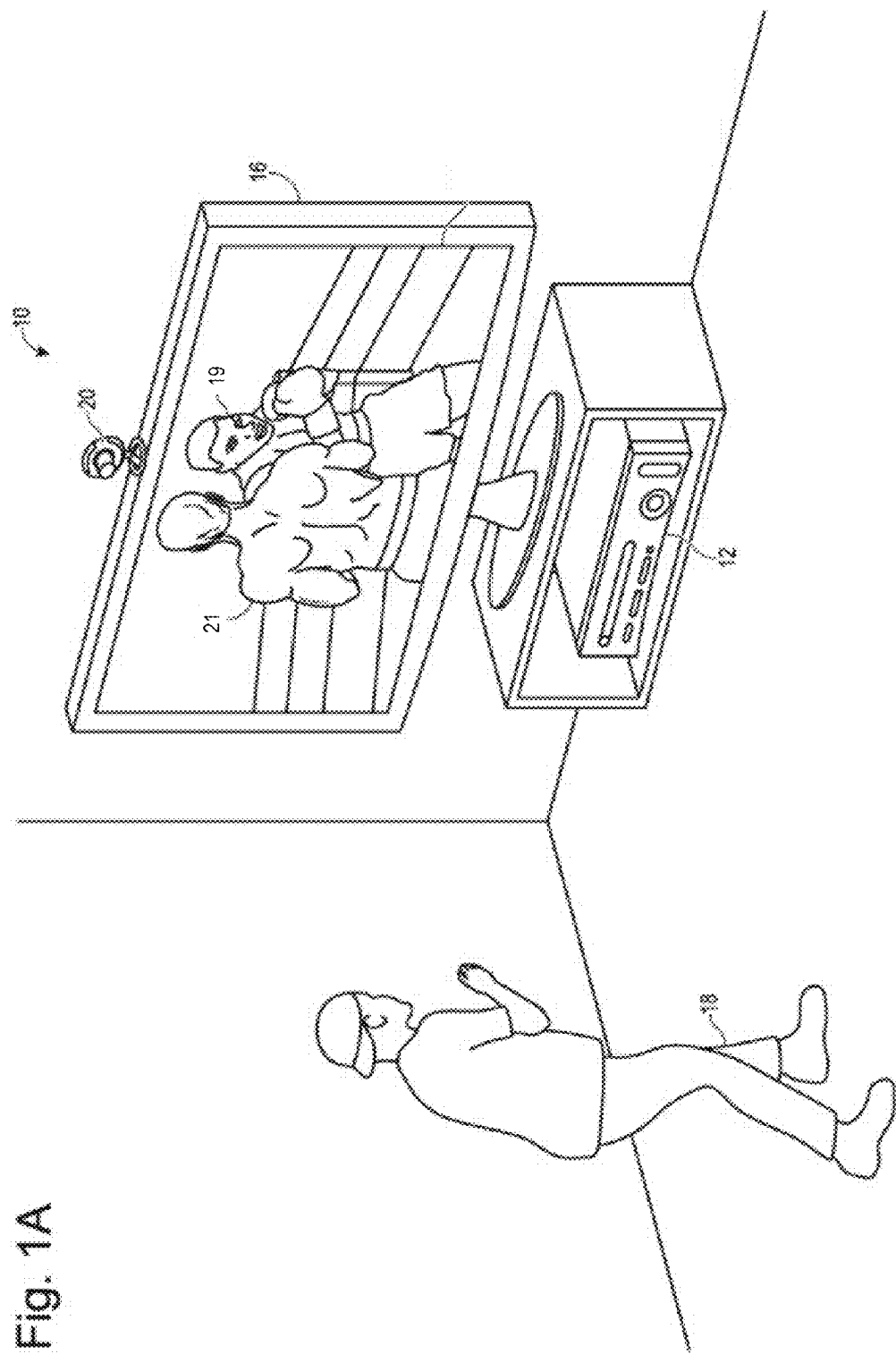
FIGS. 1A and 1B illustrate an example embodiment of a target recognition, analysis, and tracking system with a user playing a game.
Figure 1B:
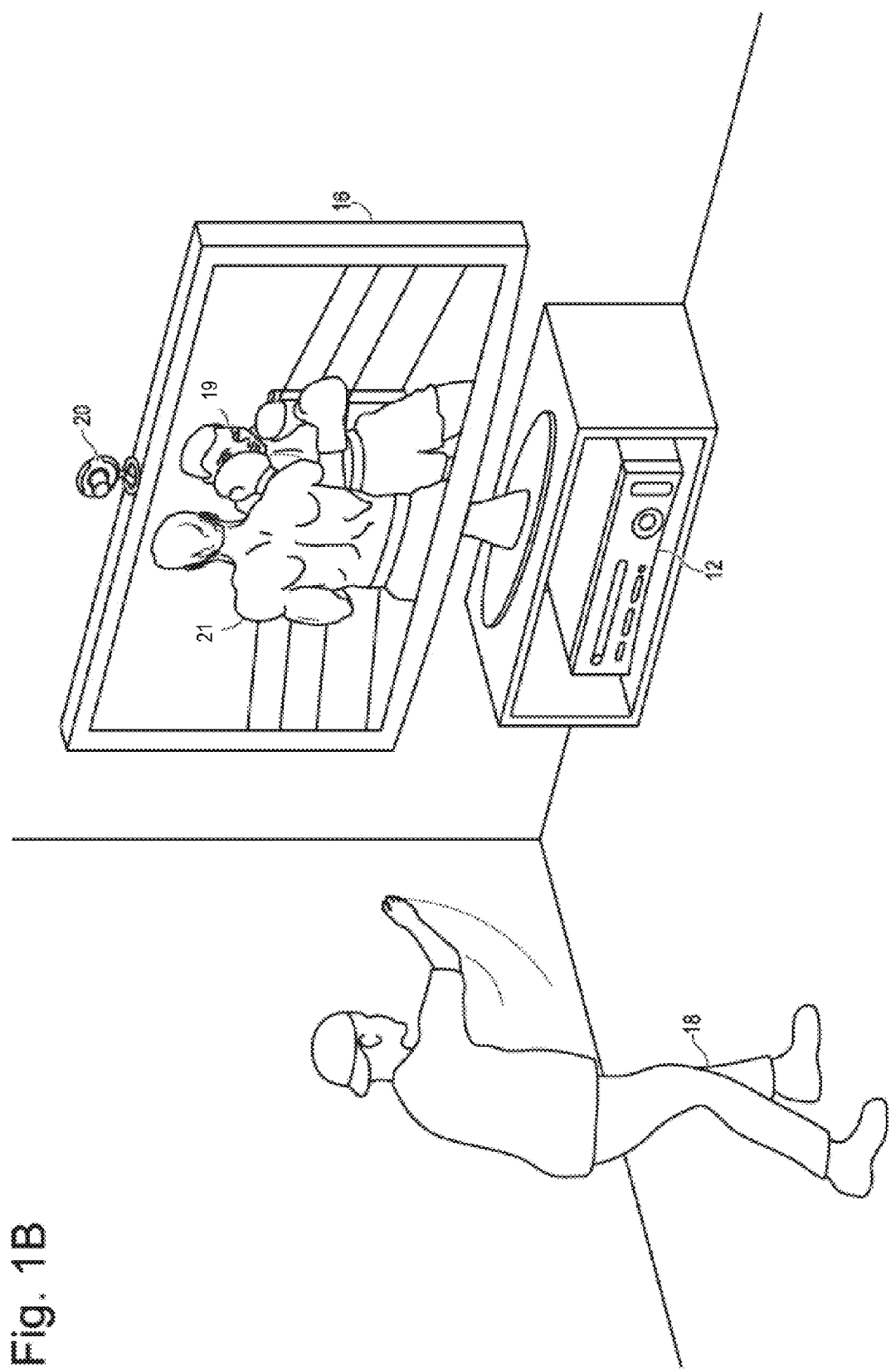
Figure 2:
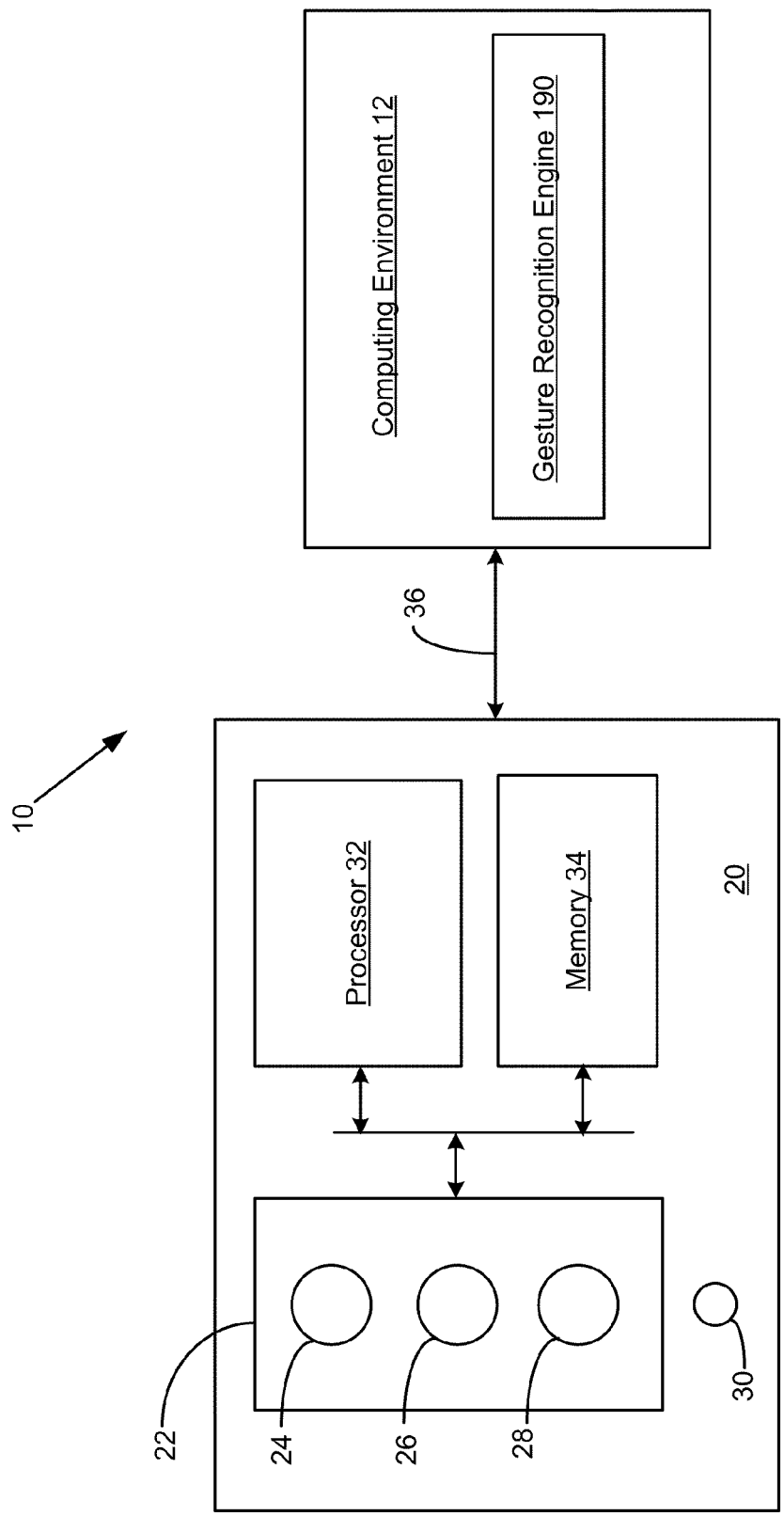
FIG. 2 illustrates an example embodiment of a capture device that may be used in a target recognition, analysis, and tracking system.

Referring initially to FIGS. 1A-2, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for capturing positions and movements performed by the user, which the computing environment receives, interprets and uses to control the gaming or other application. Each of these components is explained in greater detail below.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 19 to the user 18. The computing environment 12 may also use the audiovisual device 16 to provide a visual representation of a player avatar 21 that the user 18 may control with his or her movements. For example, as shown in FIG. 1B, the user 18 may throw a punch in physical space to cause the player avatar 21 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 21 in game space.

Other movements by the user 18 may also be interpreted as other controls or actions, such as controls to bob, weave, shuffle, block, jab, or throw a variety of different power punches. In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

FIG. 2 illustrates an example embodiment of the capture device 20 that may be used in the target recognition, analysis, and tracking system 10. Further details relating to a capture device for use with the present technology are set forth in copending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may track the skeletal model and render an avatar associated with the skeletal model. The computing environment may further determine which controls to perform in an application executing on the computer environment based on, for example, gestures of the user that have been recognized from the skeletal model. For example, as shown, in FIG. 2, the computing environment 12 may include a gesture recognition engine 190. The gesture recognition engine 190 is explained hereinafter, but may in general include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture recognition engine 190 to identify when a user (as represented by the skeletal model) has performed one or more gestures. Those gestures may be associated with various controls of an application. Thus, the computing environment 12 may use the gesture recognition engine 190 to interpret movements of the skeletal model and to control an application based on the movements.

Figure 3A:
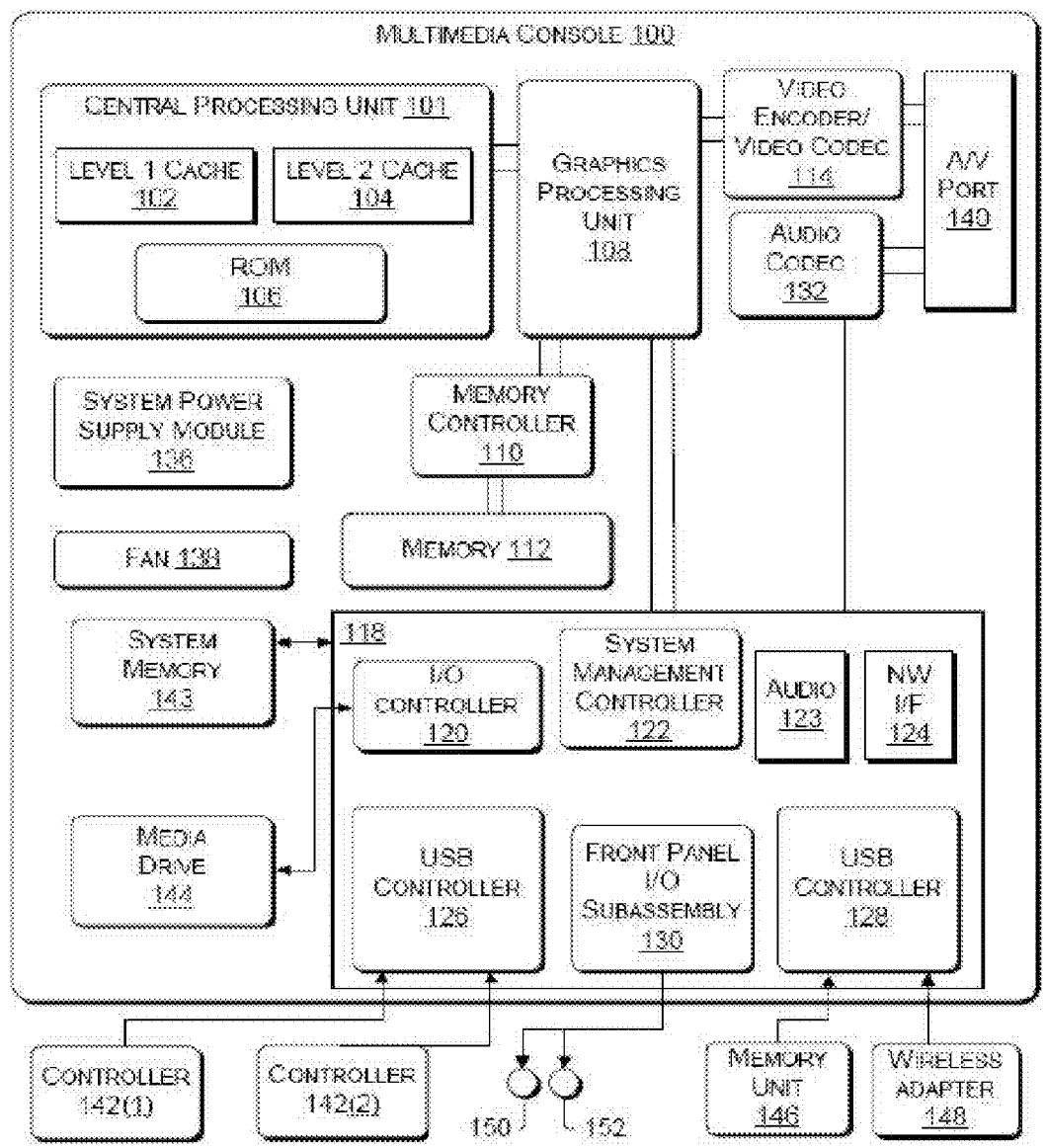
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
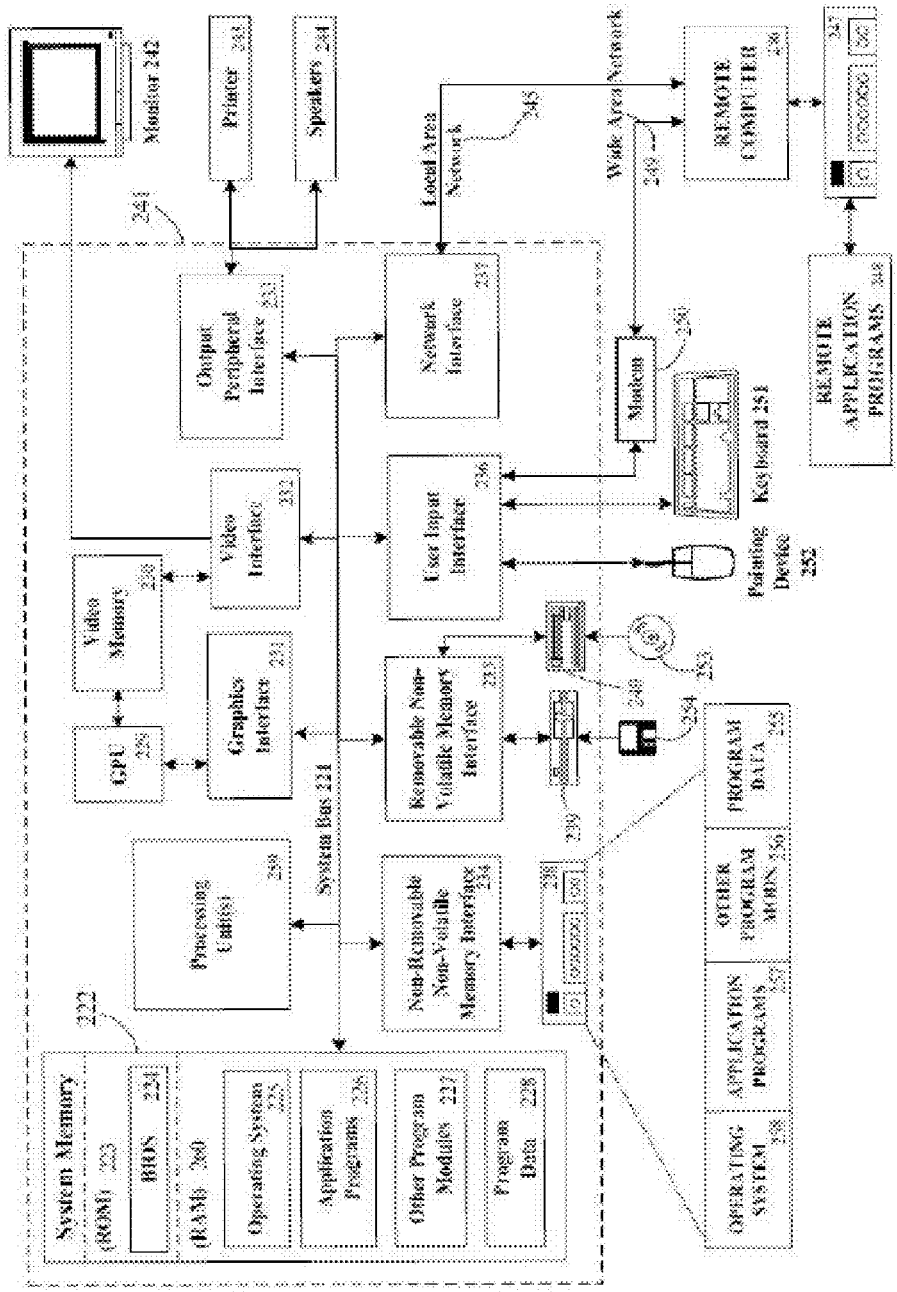
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad.

Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

As explained in greater detail below, gesture recognition engine 190 within computing environment 12 is provided for receiving position and/or movement information and identifying gestures from this information. FIG. 4A depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the mid spine 324, the top 326 and the bottom 328 of the spine, and the waist 330. Where more points are tracked, additional features may be identified, such as the bones and joints of the fingers or toes, or individual features of the face, such as the nose and eyes.

In general, the system 10 may be viewed as working with three frames of reference. The first frame of reference is the real world 3D space in which a user moves. The second frame of reference is the 3D game space, or machine space, in which the computing environment uses pose information and kinematic equations to define the 3D positions, velocities and accelerations of the user and virtual objects created by the gaming or other application. And the third frame of reference is the 2D screen space in which the user's avatar and other objects are rendered in the display. The computing environment CPU or graphics card processor converts the 3D machine space positions, velocities and accelerations of objects to 2D screen space positions, velocities and accelerations with which the objects are displayed on the audiovisual device 16.

Through moving and positioning his/her body in a given pose, a user may create gestures. A gesture may be evidenced by any of a variety of user positions and/or movements. As a few examples, a gesture may be indicated by holding one's crossed forearms 304 in front of his spine 324. Or a gesture may be a dynamic motion, such as mimicking throwing a ball or clapping the hands 302 together. A gesture may also incorporate props, such as by swinging a mock sword.

Figure 5:
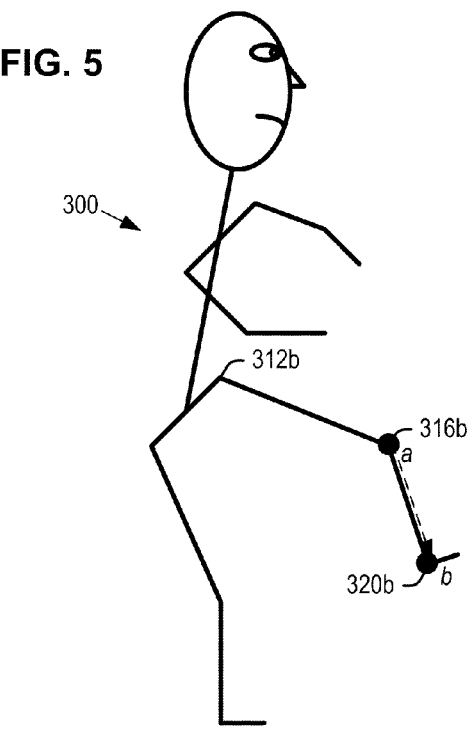
FIG. 5 illustrates a user performing a gesture and measurement of an adjacent joint position vector.

It is known to identify some gestures by measuring the position of a body part between two adjacent joints and the angle it forms with a reference. For example, FIG. 5 shows an illustration of a user 300 with his left leg lifted up. As shown in FIG. 5, the positions of the knee joint 316b and the ankle joint 320b may typically be used to define a joint position vector $\vec{ab}$ between the adjacent joints giving the orientation of the user's shin in 3D machine space relative to a reference, which may be an arbitrary origin in the 3D machine space with Cartesian coordinates (0, 0, 0). Having the shin oriented at a particular vector may be used to identify a particular gesture, such as for example that the user 300 is performing a kicking gesture.

An embodiment of the present technology is now described with reference to FIG. 6, where there is shown a user 300 in the same position as in FIG. 5. However, in accordance with the present technology, the knee joint 316b may be skipped, i.e., omitted from the measurement of the joint position vector. The measurement is instead taken along a joint position vector $\vec{bc}$ between the user's hip joint 312b and the user's ankle joint 320b. As discussed in the Background section, proximal joints (those closer to the body core) are less prone to jitter and noise, and more likely to produce a reliable indication of the gesture preformed by the user. Thus, where a gesture may have been conventionally defined by a given vector between adjacent joints in 3D machine space, that same gesture may instead be defined by a different vector between non-adjacent joints in 3D machine space according to the present technology. In embodiments, one end point of the non-adjacent joint position vector is an end joint. However, it is understood that, in an alternative embodiment, the non-adjacent joint position vector may be formed from two joints, where neither of them is the end joint. As an alternative accomplishing the same outcome, the present technology may non-adjacent position vector may use an end joint as one of the start or end point, but instead of an ankle or wrist, the end joint may be an elbow or knee.

Figure 6:
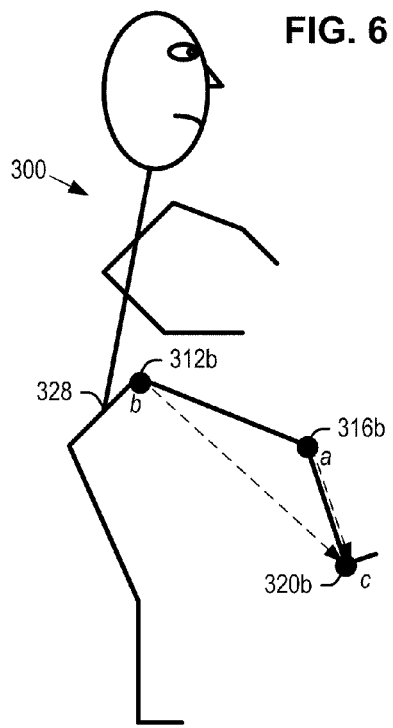
FIG. 6 illustrates a user performing a gesture and measurement of non-adjacent and adjacent joint position vectors according to an embodiment of the present technology.

FIG. 6 also shows a conventional adjacent joint position vector $\vec{ac}$ between the adjacent knee and ankle joints for measuring a gesture. The non-adjacent joint position vector $\vec{bc}$ according to the present technology may be measured instead of the conventional vector $\vec{ac}$, or the vector $\vec{bc}$ may be measured in addition to vector $\vec{ac}$, as a confirmation or reliability check on gesture recognition using a measurement of adjacent joints. The reverse may also be true—the non-adjacent joint position vector $\vec{bc}$ may be measured and the adjacent joint position vector $\vec{ac}$ may be used as the confirmation or reliability check. In general, embodiments of the present technology may include defining a gesture in terms of a vector between non-adjacent joints, and further embodiments may instead include defining a gesture in terms of at least two vectors, at least one being between non-adjacent joints and another vector between adjacent joints.

Figure 10:
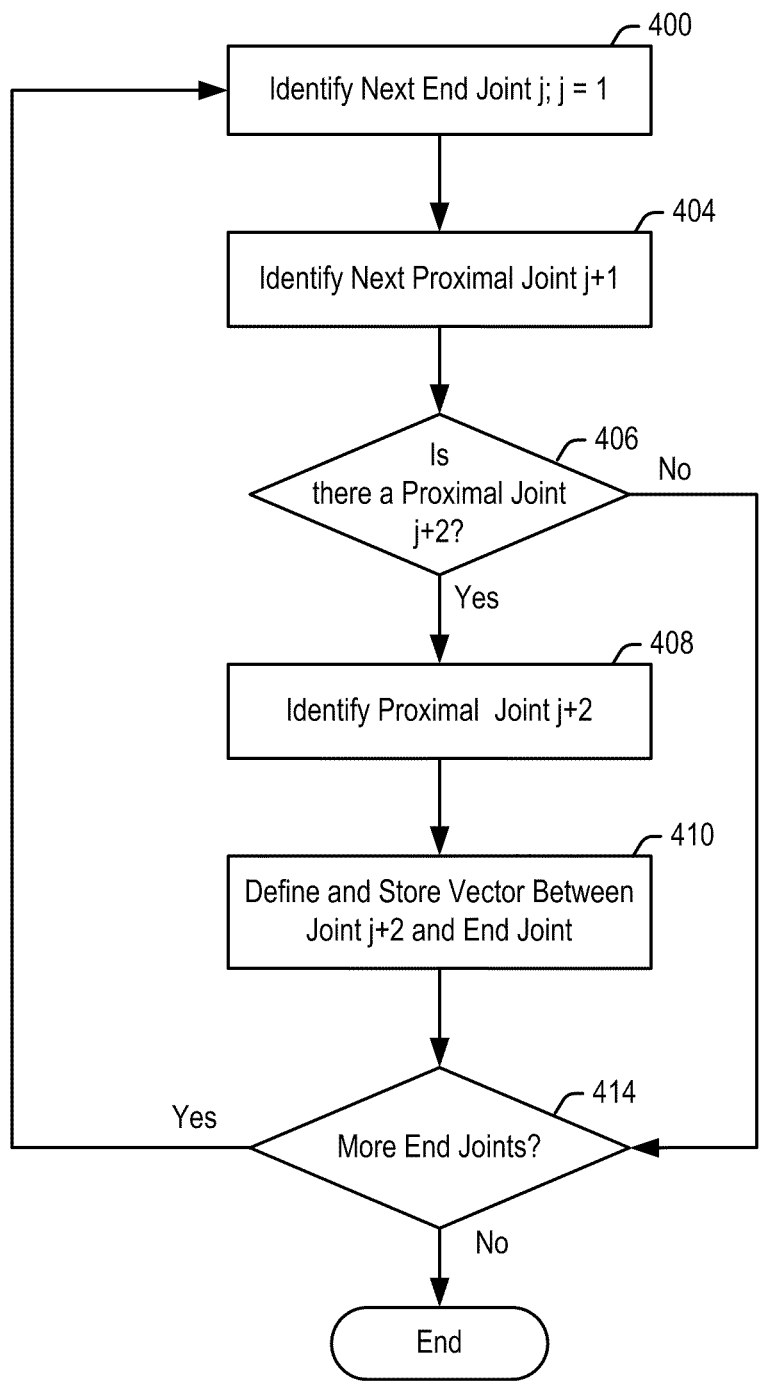
FIG. 10 is a flowchart showing the measurement of non-adjacent joint position vectors according to an embodiment of the present technology.

FIG. 10 is a flowchart for generating one or more non-adjacent joint position vectors according to the embodiment shown in FIG. 6. In embodiments, the non-adjacent joint position vectors may be generated by the processor 32 of capture device 20 or the CPU 101 (FIG. 3A)/processing unit 299 (FIG. 3B) of the computing environment 12. As described in the flowchart of FIG. 10, embodiments of the present technology may calculate all possible non-adjacent joint position vectors for later use in determining whether a set of those vectors describe a stored gesture (as set forth in more detail hereinafter). Those of skill in the art would appreciate methods for calculating less than all such non-adjacent joint position vectors in further embodiments.

Figure 4:
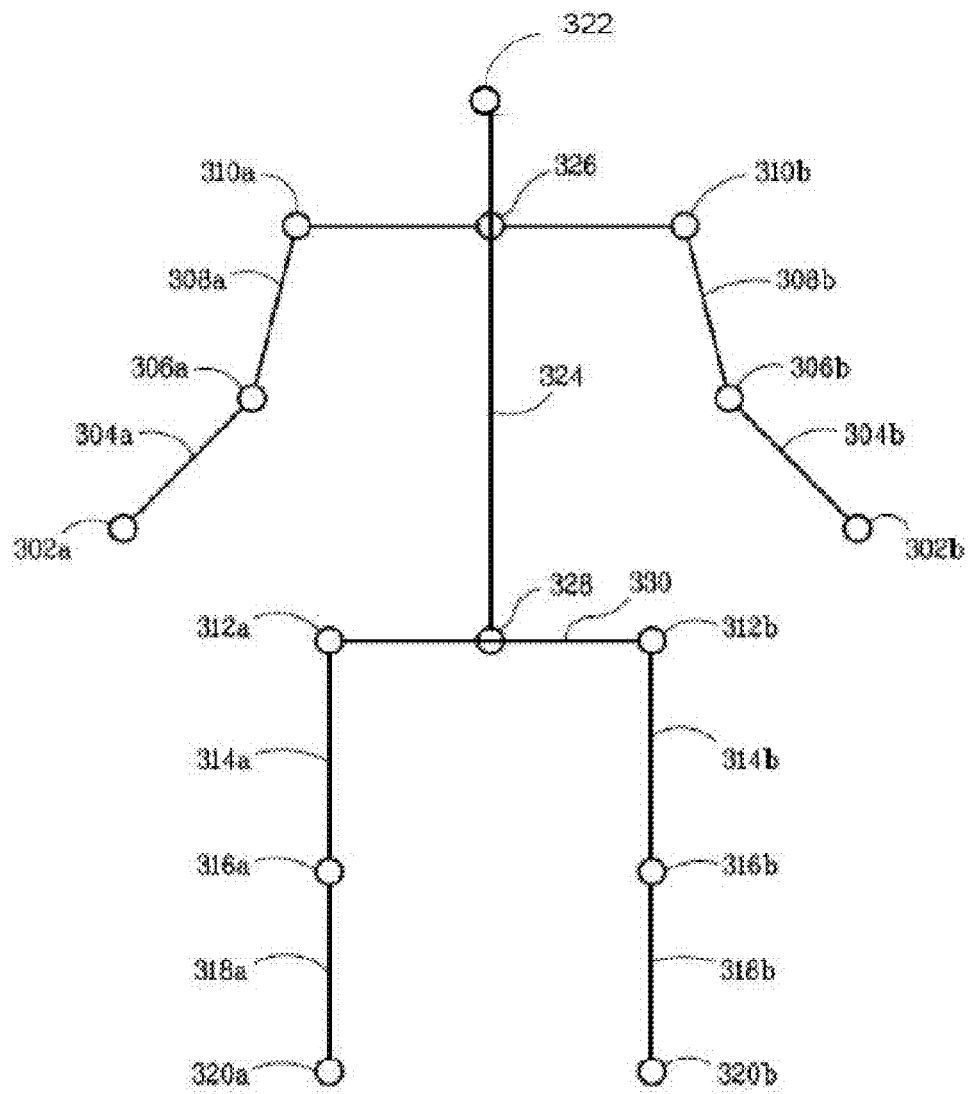
FIG. 4 illustrates a skeletal mapping of a user that has been generated from the target recognition, analysis, and tracking system of FIG. 2.

In a step 400, the system identifies an end joint and associates an arbitrary counter, j, to it. An end joint may for example be an ankle 320a, 320b (FIG. 4), a wrist 302a, 302b or a head 322. It is possible that hands and feet may be end joints in further embodiments. The system next identifies a proximal joint j+1 in step 404. A proximal joint is a joint that is closer to the body core than the end joint. In embodiments, the body core may be defined as a root joint, for example either of upper spine 326, mid spine 324 or lower spine 328 (FIG. 4). In further embodiments, two or three of joints 324, 226 and 328 may together be considered the body core or root joints. The designation j+1 indicates that this proximal joint is the next adjacent joint that is one joint away from the end joint j.

The system next determines whether there is a proximal joint j+2 in step 406. This would be a joint that is two joints away of the end joint. If the joint j+1 is itself a core joint (e.g., upper spine 326 or lower spine 328), then there are no upstream joints j+2. In an embodiment, if the end joint is a wrist or ankle, there will be a joint j+2 that is two joints more proximal of the end joint. The shoulder 310 is two joints from the wrist 301, and the hip 312 is two joints from the ankle 320. The end joint may not have a joint j+2 in embodiments. If the end joint is the head 326, this joint may be one joint away from the core, and in embodiments there would not be a joint that is two joints proximal of the end joint. This may not be the case in further embodiments. If there are no upstream joints j+2 in step 406, the system goes to step 414 to see if there are any other end joints which have not been examined.

However, if there is a joint j+2 two joints proximal of the end joint, the system identifies that joint in step 408, and the system defines and stores a non-adjacent joint position vector between the joint j+2 and the end joint j. In step 414, the system checks whether there are any other end joints which have not been examined which could potentially be part of a non-adjacent joint position vector. If there are, the system returns to step 400 and repeats the process. If there are no other end joints to examine, the system ends the definition of non-adjacent joint position vectors.

Figure 7:
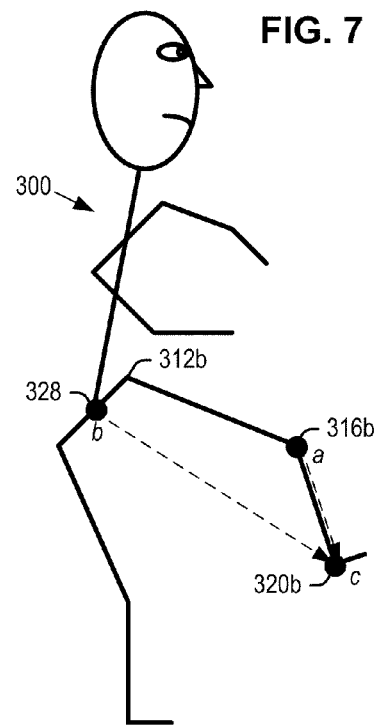
FIG. 7 illustrates a user performing a gesture and measurement of non-adjacent and adjacent joint position vectors according to an alternative embodiment of the present technology.

In the embodiment of FIG. 6, a single joint is skipped (i.e., 316b) in measuring the non-adjacent joint position vector $\vec{bc}$. However, it is understood that more than one joint may be skipped in further embodiments. For example, FIG. 7 shows an embodiment where the user 300 has again positioned his or her left leg in the air. In the embodiment of FIG. 7, the non-adjacent joint position vector $\vec{bc}$ is measured between the user's lower spine 328 and the user's ankle joint 320b. As above, the non-adjacent joint position vector $\vec{bc}$ may be used instead of or in addition to the conventional adjacent joint position vector $\vec{ac}$ in defining a given gesture.

Figure 8:
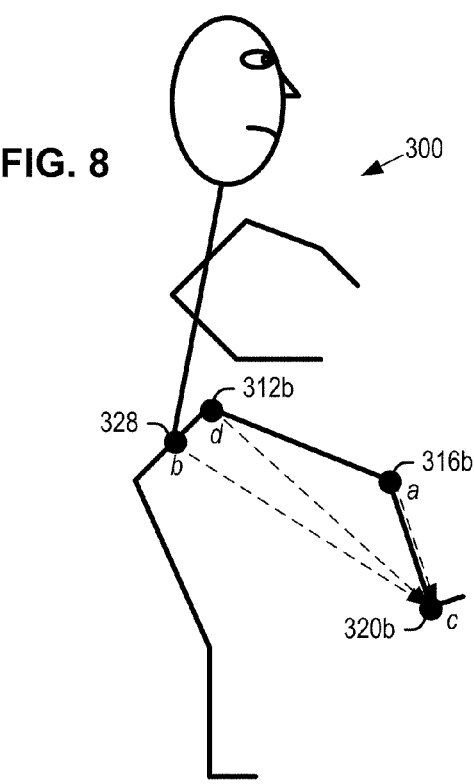
FIG. 8 illustrates a user performing a gesture and measurement of non-adjacent and adjacent joint position vectors according to a further alternative embodiment of the present technology.

In a further embodiment shown in FIG. 8, the gesture may be defined by more than two non-adjacent joint position vectors. FIG. 8 includes the vector $\vec{bc}$ from the lower spine to the ankle and the vector $\vec{ac}$ from the knee to the ankle, as shown in FIG. 7, but further includes another non-adjacent joint position vector $\vec{dc}$ measured between hip joint 312b and ankle joint 320b.

Figure 11:
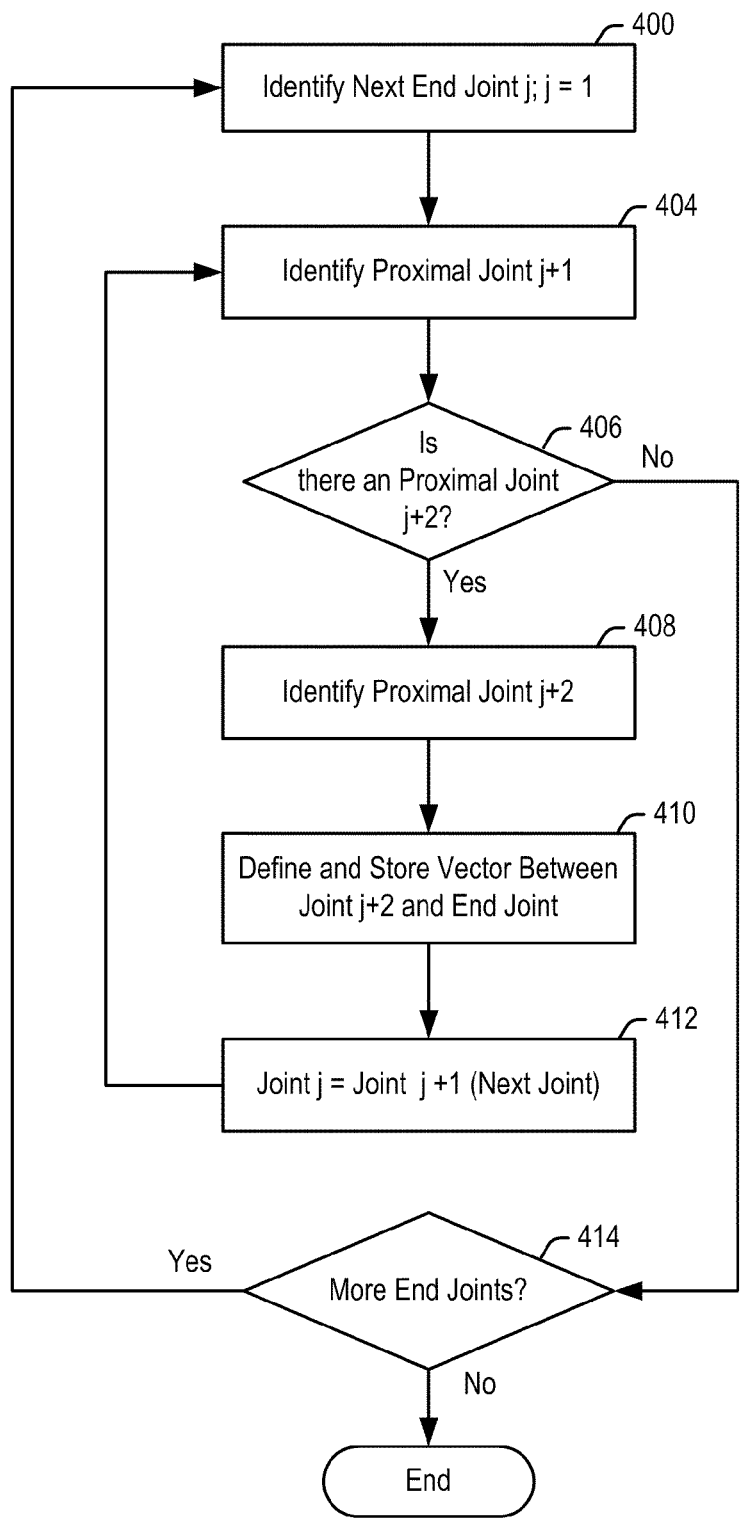
FIG. 11 is a flowchart showing the measurement of non-adjacent joint position vectors according to an alternative embodiment of the present technology.
Figure 12:
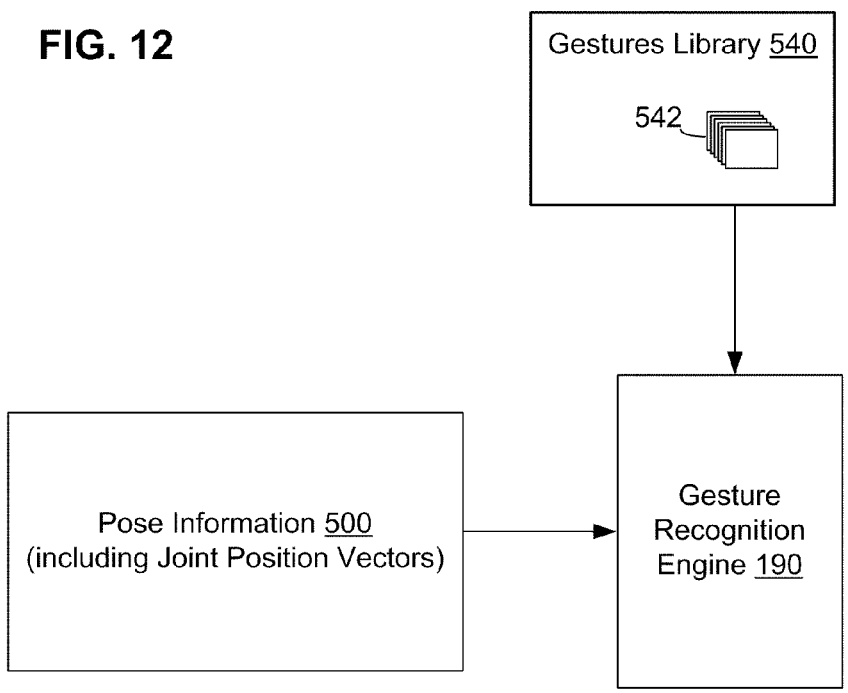
FIG. 12 is a block diagram showing a gesture recognition engine for determining whether pose information matches a stored gesture.
Figure 13:
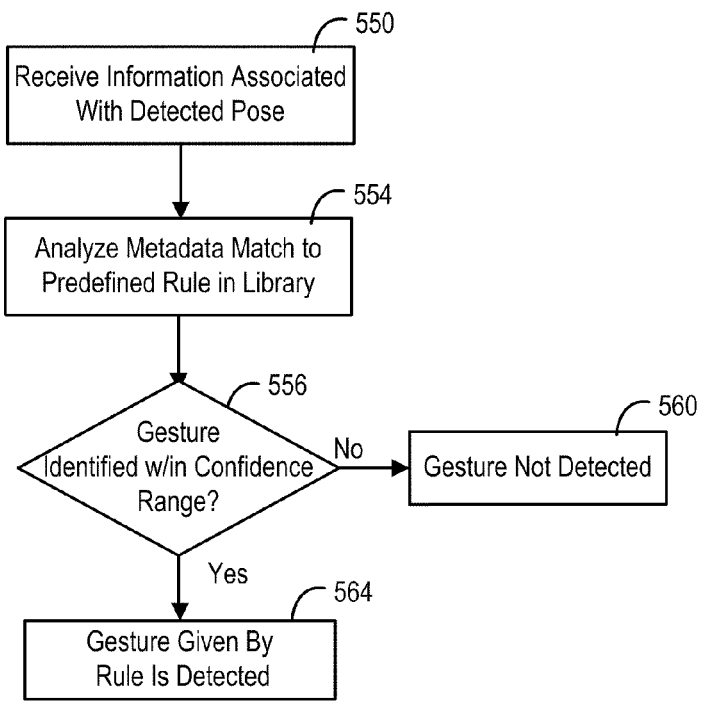
FIG. 13 is a flowchart showing the operation of the gesture recognition engine.

The flowchart of FIG. 11 describes how to generate one or more non-adjacent joint position vectors according to the embodiments shown in FIGS. 7 and 8. Steps 400 through 410 are identical to the steps described above with respect to FIG. 10. In a step 400, the system identifies an end joint and associates an arbitrary counter, j, to it. The system next identifies the next proximal joint j+1 in step 404. The system next determines whether there is a further proximal joint j+2 in step 406. Again, this would be a joint that is two joints closer to the body core than the current joint under consideration (in this embodiment, that may or may not be an end joint). If there are no proximal joints j+2 in step 406, the system goes to step 414 to see if there are any other end joints which have not been examined. However, if there is a joint j+2 two joints away from the joint under consideration, the system identifies that joint in step 408, and the system defines and stores a non-adjacent joint position vector between the joint j+2 and the end joint j.

The system next checks for additional proximal joints with which the end joint can define a non-adjacent joint position vector. That is, the system next checks whether it is possible to skip more than one joint in forming a non-adjacent joint position vector. Joint j is incremented by one. After the first time through the loop, j will be incremented to 2 and the second joint (one upstream from the end joint) will be set to j for the next loop through steps 404 through 412. If the second (or subsequent) time through the loop results in there being no proximal joint j+2 (noting that j is incrementing each time through the loop), then the system ends the consideration of that chain of joints in step 406, and checks for additional end joints in step 414. If there are more end joints, the system returns to step 400 and repeats the process, again beginning with the end joint being set to j=1. If there are no other end joints to examine, the system ends the definition of non-adjacent joint position vectors.

The above described steps will result in all possible non-adjacent joint position vectors being defined, whether there is one joint skipped, two joints skipped, etc. This is the situation shown in FIG. 8. Those of skill in the art will appreciate that the flowchart of FIG. 11 may be modified so that only the one vector representing the largest skipping of joints is made. This would be between the end joint and a core joint, as shown for example in FIG. 7.

Figure 9:
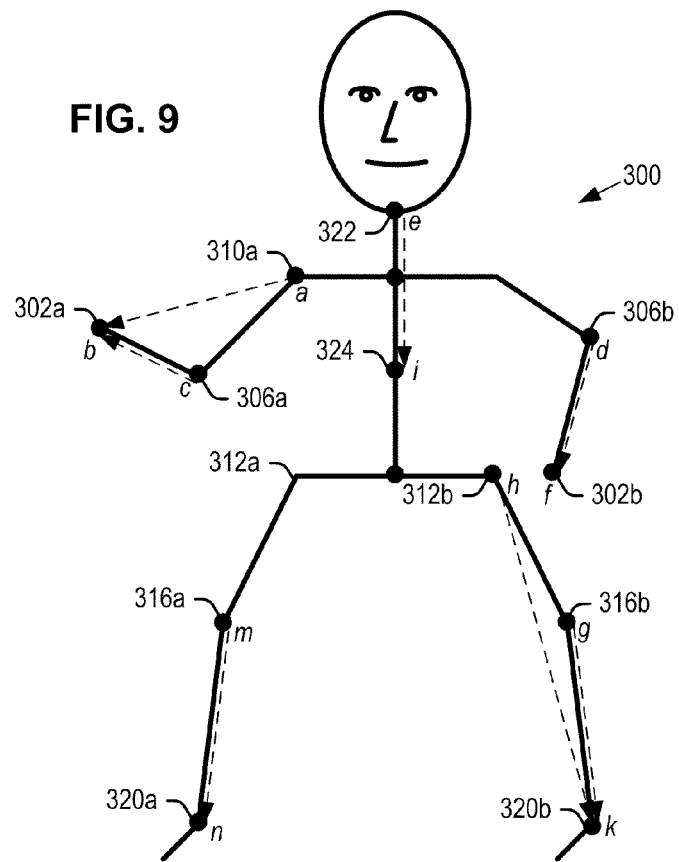
FIG. 9 illustrates a user performing a gesture and measurement of non-adjacent and adjacent joint position vectors according to another alternative embodiment of the present technology.

While FIGS. 5-8 have used the example of a gesture involving leg joints, it is understood that the present technology may use any non-adjacent joint position vectors, either alone, or in combination with other non-adjacent joint position vectors and/or adjacent joint position vectors for measuring a single gesture. FIG. 9 is a further example of an embodiment of the present technology where a given gesture may be defined by one or more of the following non-adjacent joint position vectors:

Vector $\vec{ab}$ between the right shoulder 310a and right wrist 302a;

Vector $\vec{ei}$ between the user's head 322 and mid spine 324;

Vector $\vec{hk}$ between the left hip 312b and left ankle 320b.

One or more adjacent joint position vectors may be used together with one or more of the above non-adjacent joint position vectors:

Vector $\vec{cb}$ between the right elbow 306a and right wrist 302a;

Vector $\vec{df}$ between the left elbow 306b and left wrist 302b;

Vector $\vec{hk}$ between the left hip 312b and left ankle 320b. Other non-adjacent and adjacent joint position vectors may form part of the positions that together define a single gesture.

While the above examples have shown use of an adjacent joint position vector only where the neighboring non-adjacent joint position vector is used, this need not be the case. For example, referring still to FIG. 9, a gesture may be defined including the non-adjacent joint position vector $\vec{hk}$ from the left hip 312b and the left ankle 320b and the adjacent position vector $\vec{mn}$ from the right knee 316a to the right ankle 320a. Those of skill in the art will appreciate a wide variety of other joint position vectors, including at least one non-adjacent joint position vector, for defining any of a wide variety of gestures.

As with conventional adjacent joint position vectors, in embodiments, gestures are not defined simply by examining the absolute positions of the start and end points of a non-adjacent joint position vector in 3D machine space. Rather, the two absolute positions in a vector are used to define an angle that those points form with some reference. The reference could be a point, such as the origin, a line or a plane in 3D machine space.

A user need not position his or her body at the precise joint position vector(s) used to define a gesture. Rather, a stored gesture (explained below) will include threshold values or ranges of values that a user must achieve with his joints in order to be considered the stored gesture. Thus, for example in FIG. 6, the non-adjacent joint position vector $\vec{bc}$ may be used to define a threshold as to how high the left ankle 320b must be raised relative to the left hip 312b in order to be treated as a kicking gesture. The left ankle 320b may be raised higher relative to the left hip 312b than specified in the stored vector $\vec{bc}$, and the position would still be treated as a kicking gesture.

Moreover, it is understood that not all portions of a vector need have specified x, y and z values. A stored gesture may only be interested in the relative x positions of the start and end points of a joint position vector. A stored gesture may only be interested in the relative y positions of the start and end points of a joint position vector. And a stored gesture may only be interested in the relative z positions of the start and end points of a joint position vector. For example, referring again to FIG. 6, where a user positions his left ankle 320b high enough (e.g., along the z-axis) relative to the left hip 312b, the gesture may be satisfied independent of the ankle/knee positions in the x-direction or the y-direction. Thus, the user may perform the gesture near to or far from the capture device 20 (e.g., along the x-axis), or to the left or right of the capture device 20 (e.g., along the y-axis), and the system will still detect the gesture.

The above description of FIGS. 6-11 set forth how to generate non-adjacent joint position vectors for use alone or with other non-adjacent or adjacent joint position vectors, for describing user gestures. These gestures defined by the joint position vectors may be used for input by the gesture recognition engine 190 in a general computing context. For instance, various motions of the hands 302 or other body parts may correspond to common system wide tasks such as navigate up or down in a hierarchical list, open a file, close a file, and save a file. Gestures may also be used by the gesture recognition engine 190 in a video-game-specific context, depending on the game. For instance, with a driving game, various motions of the hands 302 and feet 320 may correspond to steering a vehicle in a direction, shifting gears, accelerating, and breaking.

Those of skill in the art will understand a variety of methods of analyzing measured parameters, including joint position vectors, to determine whether the parameters conform to a predefined gesture. Such methods are disclosed for example in the above incorporated application Ser. No. 12/475,308, as well as U.S. Patent Application Publication No. 2009/0074248, entitled "Gesture-Controlled Interfaces For Self-Service Machines And Other Applications," which publication is incorporated by reference herein in its entirety. However, in general, user positions and movements are detected by the capture device 20. From this data, the above-identified joint position vectors may be determined. The joint position vectors are then passed to the gesture recognition engine 190, together with other pose information. The operation of gesture recognition engine 190 is explained in greater detail with reference to the block diagram of FIG. 12 and the flowchart of FIG. 13.

The gesture recognition engine 190 receives pose information 500 in step 550. The pose information may include a great many parameters in addition to joint position vectors. Such additional parameters may include the x, y and z minimum and maximum image plane positions detected by the capture device 20. The parameters may also include a measurement on a per-joint basis of the velocity and acceleration for discrete time intervals. Thus, in embodiments, the gesture recognition engine 190 can receive a full picture of the position and kinetic activity of all points in the user's body.

The gesture recognition engine 190 analyzes the received pose information 500 in step 554 to see if the pose information matches any predefined rule 542 stored within a gestures library 540. A stored rule 542 describes when particular positions and/or kinetic motions indicated by the pose information 500 are to be interpreted as a predefined gesture. In embodiments, each gesture may have a different, unique rule or set of rules 542. Each rule may have a number of parameters (joint position vectors, maximum/minimum position, change in position, etc.) for one or more of the body parts shown in FIG. 4. A stored rule may define, for each parameter and for each body part part 302 through 330 shown in FIG. 4, a single value, a range of values, a maximum value, a minimum value or an indication that a parameter for that body part is not relevant to the determination of the gesture covered by the rule. Rules may be created by a game author, by a host of the gaming platform or by users themselves.

The gesture recognition engine 190 may output both an identified gesture and a confidence level which corresponds to the likelihood that the user's position/movement corresponds to that gesture. In particular, in addition to defining the parameters required for a gesture, a rule may further include a threshold confidence level required before pose information 500 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture rule, the gesture recognition engine 190 then determines in step 556 whether the confidence level is above a predetermined threshold for the rule under consideration. The threshold confidence level may be stored in association with the rule under consideration. If the confidence level is below the threshold, no gesture is detected (step 560) and no action is taken. On the other hand, if the confidence level is above the threshold, the user's motion is determined to satisfy the gesture rule under consideration, and the gesture recognition engine 190 returns the identified gesture.

Given the above disclosure, it will be appreciated that a great many gestures may be identified using joint position vectors and particularly non-adjacent joint position vectors. As one of many examples, the user may lift and drop each leg 312-320 to mimic walking without moving. The gesture recognition engine 190 may parse this gesture by analyzing information from each hip 312 with respect to each ankle joint 320. In particular, a standing leg has a hip-ankle angle of 0°, and a forward horizontally extended leg has a hip-ankle angle of, for example, 90° relative to a vertical reference line or plane. In such an example, a step may be recognized when one hip-ankle angle exceeds a certain threshold relative to the reference line or plane (which may be vertical, horizontal or otherwise). A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

In a further example, a kick may be a gesture which comprises an ankle provided at a given angle above a threshold relative to a hip. The pose information 500 for that gesture may include a variety of data, including threshold joint position vectors described above. Where the gesture is a kick, for example, the pose information 500 may be or include a vector defining threshold position of an ankle relative to the hip. These examples are not limiting, and gesture recognition engine 190 may identify a great many other gestures using non-adjacent joint position vectors.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. In a system comprising a computing environment coupled to a capture device for capturing user position, a method of generating pose information for use in determining whether a user has performed a given gesture, the method comprising:
   (a) detecting via the capture device a location of a first skeletal joint of the user position;
   (b) detecting via the capture device a location of a second skeletal joint of the user position that is not a joint adjacent to the first skeletal joint; and
   (c) generating the pose information, directly including the location of the first skeletal joint relative the location of the second skeletal joint, for use in determining whether a user has performed a given gesture;
   wherein joint adjacency is determined along a user's body.

2. The method of claim 1, said step (a) of detecting a location of a first skeletal joint comprising the step of detecting a location of an end joint.

3. The method of claim 1, said step (b) of detecting a location of a second skeletal joint that is not adjacent to the first skeletal joint comprising the step of detecting a location of a second skeletal joint that is two joints away from the first skeletal joint.

4. The method of claim 1, said step (b) of detecting a location of a second skeletal joint that is not adjacent to the first skeletal joint comprising the step of detecting a location of a second skeletal joint that is three joints away from the first skeletal joint.

5. The method of claim 1, said step (c) of generating pose information including the relative locations of the first and second skeletal joints comprising the step of generating a non-adjacent joint position vector forming an angle with a predefined reference.

6. The method of claim 1, further comprising:
   (d) detecting a location of a third joint; and
   (e) generating the pose information, including the location of the first skeletal joint relative the location of the third skeletal joint.

7. The method of claim 6, said step (d) of detecting a location of the third joint comprises the step of detecting the third joint at a location that is adjacent to the first joint.

8. The method of claim 6, said step (d) of detecting a location of the third joint comprises the step of detecting the third joint at a location that is spaced two or more joints away from the first joint.

9. A method performed by a computing environment of detecting whether a user has performed a given gesture, the method comprising:
   (a) detecting a location of a first skeletal joint of the user position;
   (b) detecting a location of a second skeletal joint of the user position that is not a joint adjacent to the first skeletal joint;
   (c) generating a non-adjacent joint position vector having as end points the locations of the first and second skeletal joints detected in steps (a) and (b); and
   (d) using the non-adjacent joint position vector generated in said step (c) to determine whether or not the user has performed a given gesture;
   wherein joint adjacency is determined along a user's body.

10. The method of claim 9, said step (a) of detecting a location of a first skeletal joint comprising the step of detecting a location of an end joint.

11. The method of claim 9, further comprising:
(e) detecting a third location of third skeletal joint of the user position that is not a joint adjacent to the first skeletal joint;
(f) generating a non-adjacent joint position vector having as end points the locations of the first and third skeletal joints detected in steps (a) and (e).

12. The method of claim 9, further comprising:
(g) detecting one or more additional locations of every other joint, beside the second joint, that is proximal of the first joint up to and including a joint located at a core of the user's body that is at least two joints away from the first joint;
(h) generating additional non-adjacent joint position vectors, one each for each additional location detected in said step (g), each additional non-adjacent joint position vector extending between an additional location detected in said step (g) and the location of the first joint.

13. The method of claim 12, further comprising the step of using one or more of the additional non-adjacent joint position vectors generated in said step (e) in determine whether or not the user has performed a given gesture.

14. The method of claim 12, further comprising:
(j) detecting a location of an adjacent joint that is adjacent to the first joint; and
(k) generating an adjacent joint position vector extending between the location of the adjacent joint detected in said step (j) and the location of the first joint.

15. The method of claim 9, said steps (a) through (c) generating non-adjacent joint position vectors extending between the user's ankle joint and hip joint.

16. The method of claim 9, said steps (a) through (c) generating non-adjacent joint position vectors extending between the user's wrist joint and shoulder joint.

17. A system for detecting gestures performed by a user in real world space, the system comprising:
a capture device for capturing a depth image of a user within the field of view;
a computing environment for receiving the depth image from the capture device and determining a location of a plurality of joints, the plurality of joints including an end joint, at least one intermediate joint proximal of the end joint, and a core body joint proximal of the at least one intermediate joint; and
a processor within one of the capture device and computing environment for generating a non-adjacent joint position vector having end points at an end joint and a joint that is not adjacent to the end joint from one of the at least one intermediate joints and core body joint, the non-adjacent joint position vector used to determine whether the user has performed a predefined gesture;
wherein joint adjacency is determined along a user's body.

18. The system of claim 17, the non-adjacent joint position vector comprising a first non-adjacent joint position vector, the processor further generating a second non-adjacent position vector having as end points the end joint and another joint not being a joint adjacent the end joint and not being a joint forming part of the first non-adjacent joint position vector.

19. The system of claim 17, the processor further generating an adjacent position vector having as end points the end joint and a joint adjacent the end point.

20. The system of claim 17, wherein the processor is included in the computing environment, the processor further generating pose information including the non-adjacent joint position vector, comparing the pose information against stored gestures, and determining whether the pose information indicates that a given gesture of the stored gestures has been performed.

* * * * *